APPARATUS FOR READING BINARY MAGNETIC RECORDINGS

Filed Dec. 29, 1961

INVENTORS
EVERT VAN DER HOEK
GERRIT JAN LANSINK

BY Frank R. Jifari
AGENT

United States Patent Office 3,234,530
Patented Feb. 8, 1966

3,234,530

APPARATUS FOR READING BINARY MAGNETIC RECORDINGS

Evert van der Hoek, Hengelo, and Gerrit J. Lansink, Enschede, Netherlands, assignors to N. V. Hollandse Signaalapparaten, Hengelo, Netherlands, a firm of the Netherlands Filed Dec. 29, 1961, Ser. No. 163,336
Claims priority, application Netherlands, Jan. 9, 1961, 259,873/61
9 Claims. (Cl. 340—174.1)

This invention relates to a system for reading, by means of a magnetic head, binary magnetic recordings on a surface of magnetic material. Bits of one type are recorded by a first magnetization of the surface in the track scanned by the magnetic head during the relative motion of head and surface, while bits of the other type are recorded by a second magnetization in the said track which is preferably oppositely directed to that of the first magnetization. The amplitudes of the two magnetizations lie preferably in two separate ranges and there are no places on the surfaces between the recordings of two successive bits in which there is magnetication having a value other than that corresponding to one of the bits. The magnetic head cooperates with a circuit which, depending upon the direction of the pulse induced in the magnetic head, applies a pulse derived therefrom to one of two control circuits of a bi-stable trigger circuit. The latter is triggered into each of its possible stable states corresponding to a bit of a certain type in response to the change in the scanned magnetization, which is dependent on the sense and position of the recorded bits.

In this type of system the magnetic head will produce a voltage pulse only if a point in the track is scanned at which the type of the recorded bits changes. If the recordings of two bits of the same type are successively scanned the magnetization scanned by the magnetic head remains unchanged, so that no voltage is generated in the winding of the head.

The voltage induced in the head has one direction when the recording changes from that of a 0 bit into that of a 1 bit, and has the opposite direction when the opposite change of the recording is scanned. The pulses produced by the magnetic head do not correspond to the bits which were originally recorded. The trigger circuit restores these bits. In certain known systems the pulses produced by the magnetic head control the bi-stable trigger circuit, e.g. by way of oppositely directed diodes, causing the pulses to be directed to one or the other control circuit of the trigger circuit depending on their sign. If by way of both control circuits the trigger circuit reacts to pulses of the same sign, which will generally be the case, one of the control circuits must comprise an inverter circuit.

The pulses induced in the magnetic head are very weak. Separation of these pulses into positive and negative pulses is only possible after amplification. In well known systems alternating current amplifiers are used for this purpose. Such an amplifier supplies at its output circuit positive and negative pulses which correspond to the positive and negative pulses supplied by the magnetic head. It is not difficult to separate these positive and negative pulses and to lead them to separate control circuits of the bi-stable trigger circuit by means of simple diodes.

An alternating current amplifier used for this purpose has, however, various disadvantages. Generally a system of the type described above has a certain number of magnetic heads scanning different tracks; these heads must be able to cooperate with the same amplifier. In order to connect the selected magnetic head to the amplifier an electronic switching device, such as a diode matrix, is inserted between the magnetic heads and the amplifier. While it is establishing the connection, such a switching device generates pulses, the amplitude of which is substantially larger than that of the weak pulses supplied by the magnetic heads. These pulses are also applied to the input circuit of the amplifier. They charge the coupling capacitors in the alternating current coupling circuits between the successive stages of the amplifier to relatively high voltages. In order to prevent these voltages from blocking the amplifier during too long an interval, the said coupling circuits must have small time constants. Alternating current coupling circuits with small time constants, however, operate as differentiating circuits and cause a pulse of opposite sign to follow each amplified pulse. The pulses resulting from the differentiating effect of the coupling circuits are also amplified. Such a pulse must be prevented from influencing the trigger circuit because it would change or possibly neutralize the effect on the trigger circuit of the preceding pulse resulting from the amplification of a pulse supplied by the magnetic head. This puts a limit to the reduction of the time constants of the coupling circuits, so that even in the most favorable case the amplifier will be blocked during a relatively long interval after the electronic switch has effected a switching operation. In a drum storage system this waiting interval may be even longer than the duration of a full rotation of the drum, so that the speed of operation of the system will be substantially reduced.

If direct current amplifiers were used for amplifying the pulses produced by the magnetic heads such complications would not occur because the coupling circuits between the successive stages of such a direct current amplifier do not comprise coupling capacitors. The output voltages of a direct current amplifier are, however, superposed on a direct voltage level, which, as a result of the drift of the amplifier, can vary to such an extent that an effective separaticn of pulses of different sign is made impossible.

According to one aspect of the invention, the drift of the direct current amplifier is prevented from impeding the separation of the pulses; thus the application of such an amplifier as reading amplifier in a drum storage system of the above type is made possible. For this purpose according to the invention the pulses supplied by a magnetic head are amplified by means of a direct current amplifier, while the output voltage of this amplifier or a voltage derived therefrom is supplied to a network having a time constant which is large with respect to the duration of a bit; the output voltage of the said amplifier, or a voltage derived therefrom, is compared with the output voltage of the said network, or a voltage derived therefrom; as a result of the comparison a pulse is supplied to one control circuit of the bi-stable trigger circuit if the first compared voltage exceeds, or exceeds at least to a certain extent, the last mentioned voltage, while a pulse is applied to the other control circuit of the trigger circuit if the said first compared voltage is lower, or at least to a certain extent lower, than the last mentioned voltage.

The time constants of the coupling circuits between the stages of a direct current amplifier are determined by the small stray capacities of the circuit elements, and are, therefore, very small. The transients in the amplifier resulting from switching operations in the electronic switching system between the amplifier and the magnetic head, will, therefore, diminish rapidly.

The changes in the level on which the amplified voltages supplied by the amplifier are superposed, in so far as these changes result from the drift, are very slow, so that the output voltage of the network with a large time constant will always correspond to the average level of the output voltage of the amplifier. By comparing the output voltages of the amplifier, or voltages derived therefrom, with the output voltage of the said network, or a voltage derived from this output voltage, it is possible to separate effectively the voltage changes which result from the two possible changes in the magnetization of the recording surface.

In order to effect the separation of the positive and negative pulses, in a preferred embodiment according to the invention each of the two control circuits of the bistable trigger circuit is connected by means of a resistance to a point of fixed potential; the control circuits are also connected by separate diodes having the same direction as seen from the control circuit to which they are connected to the points carrying the potentials to be compared. The point of fixed potential has a potential which is under all circumstances higher for one control circuit and lower for the other control circuit than the two potentials to be compared and directions of the diodes are such that at least one of the diodes connected to a control circuit will be conductive. The diode circuits described above are generally denoted by the name "or" circuit, although in some instances a nomenclature is used in which these circuits are called either "and" circuits or "or" circuits depending upon the direction of the potential variations to which they should respond.

The invention will now be explained by describing certain of its embodiments with reference to the drawings.

Figure 1:
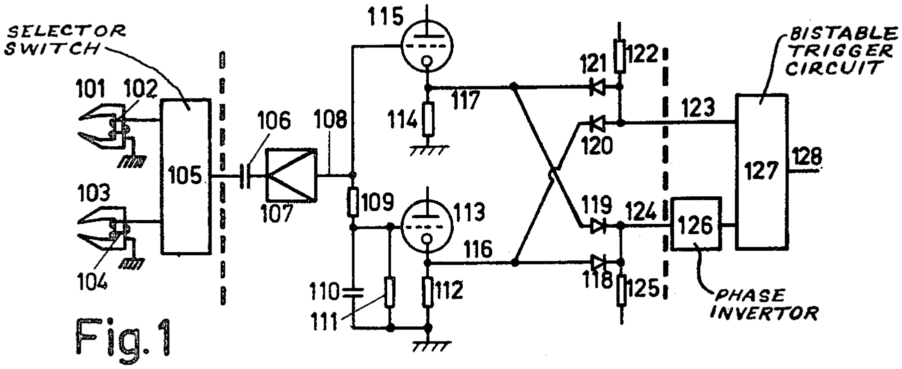
FIGURE 1 shows a first embodiment of a system according to the invehtion.

FIGURE 1 shows a system for reading a drum storage, in which an amplifier 107 can be connected to each of a number of magnetic heads of the drum storage system. The drum storage system may be of any type well-known in the electronic calculator art. Two of the magnetic heads, 101 and 103, are shown in the figure. Each of these heads comprises an iron core having an airgap situated in the vicinity of the moving surface of the drum. Each core carries a winding (102, 104), in which voltages can be induced by the magnetic recordings in the surface layer of the drum. One end of each of these windings is connected to ground. The other end is connected to an input circuit of an electronic selector switch 105. Each of the magnetic heads scans a track on the drum, in which the magnetization has a certain value if bits of the one type are recorded in the said track and has substantially the same absolute value, but the opposite sign, when bits of the other type are recorded in the track. Consequently, a voltage pulse with a certain amplitude and a certain sign will be induced in the winding 102, carried by the magnetic head 101, if a point in the track at which a recording of bits of the one type changes into a recording of bits of the other type passes under this head, while a voltage of substantially the same amplitude, but opposite sign, is induced by the opposite change of the recording. If the successive recordings are related to bits of the same type no voltage is induced in the winding.

The electronic selector switch 105 may be any one of a number of well-known types and need not, therefore, be described. It can, for instance, be a selector effecting its connections by means of diodes or transistors. For purposes of this description, it is assumed that the selector is a diode matrix switch. If the track passing under the magnetic head 101 is to be read, the winding 102 is connected by means of the selector 105 to the input circuit of the amplifier 107. In order to make a certain path in the selector 105 conductive, switching voltages must be applied to certain diodes in this selector. These switching voltages influence the direct voltage level of the output circuit of the selector switch 105 and, consequently, also the direct voltage level on which the pulses induced in the selected magnetic head are superposed before they reach the amplifier 107. Because the characteristics of the diodes may differ substantially, and these characteristics depend, moreover, on temperature, the said direct current level will exhibit changes which are substantially larger than the amplitude of the voltages induced in the windings of the magnetic head. If the operating range of the amplifier is not substantially larger than twice the amplitude of the pulses to be amplified and if a direct current coupling circuit is situated between the selector and the amplifier, the input voltages will easily exceed the operating range of the amplifier as a result of these changes of level. Amplifiers with a large operating range are, however, expensive. In order to prevent the voltage level changes resulting from the switching voltages from influencing the operation of the amplifier, the capacitor 106 is inserted between the selector switch 105 and the direct current amplifier 107. The coupling circuit comprising this capacitor will have a certain time constant, so that sufficient time must elapse between a switching operation in the diode switch and the first pulse to be amplified following this switching operation in order to permit the transients resulting from the switching operation to disappear. Moreover, the capacitor circuit acts as a differentiator. It is, however, the only alternating current coupling circuit in the complete system, so that the differentiating effect is not great enough to be too serious, and the capacity of the capacitor 106 can be reduced to such an extent that the duration of the transients remains below a permissible limit. Because such a capacitor is only present in one point of the system, and consequently low resistances in the capacitor circuit will only influence the amplification of one stage, there are no objections to reducing the time constant of the input circuit by using low resistances in the coupling circuit.

All coupling circuits between the successive stages in the amplifier 107 are direct current coupling circuits which do not comprise coupling capacitors. The pulses generated in one of the magnetic heads and applied by way of the selector 105 to the input circuit of the amplifier are amplified by this amplifier and appear in its output circuit superposed on a direct voltage level which may vary substantially as a result of the drift of the amplifier. This output voltage is applied to an R-C network consisting of a resistance 109, in series with a capacitor 110 and a resistance 111, connected in parallel. The time constant of this network is at least a high multiple of the duration of a bit of the type recorded on the drum. The voltage across the capacitor 110 consequently corresponds to the average value of the output voltage of the direct current amplifier 107 and to the level on which the pulses amplified by the amplifier 107 are superposed. The voltage across the condenser 110 is applied to the grid of the cathode follower 113 having cathode resistance 112. The voltage present at the output circuit 116 of this cathode follower consequently corresponds to the average value of the output voltage of the amplifier 107. The output voltage on the amplifier 107 is also directly applied to the grid of the cathode follower 115 having cathode resistance 114. The voltage appearing at the output circuit 117 connected to the cathode of this cathode follower is a reproduction of the output voltage of the amplifier 107, the amplified pulses included. The task of the two cathode followers 113 and 115 is to prevent the relatively low impedances occurring after these cathode followers from influencing the circuit before them.

The output circuits 116 and 117 of the two cathode followers are connected by way of circuits having the character of "or" circuits to the control circuits 123 and 124 of the bi-stable trigger circuit 127; one of these "or" circuits responds to voltage-increases while the other responds to voltage-decreases at one of its input terminals. The upper terminal of the resistance 122 is connected to a point whose potential is always higher than the output potential of the amplifier 107. The lower terminal of the resistance 125 is connected to a point whose potential is always lower than the output potential of the direct current amplifier 107.

The operation of the system is as follows: Assume that no pulses are applied to the amplifier. The potential of the output circuit 108 will then correspond to the level on which the amplified pulses are superposed. The potentials of the output circuits 116 and 117 of the two cathode followers will correspond to this level and will have the same value. The lower terminal of the resistance 125 has a lower potential, so that it may be assumed that the diodes 118 and 119 are conductive, and that the potential of the control circuit 124 corresponds to the said average value. The potential of the upper terminal of the resistance 122 is higher than said average level, so that the two diodes 120 and 121 are also conductive and the potential of the control circuit 123 will also correspond to the average level. No influence is exerted on the trigger circuit 127 in this state of the system. Now assume that a pulse is applied to the input circuit of the amplifier having a nature such that a positive pulse is superposed on the quiescent level of the potential of the output circuit of the amplifier. Because of the large time constant of the R-C network this positive pulse has no perceptible influence on the voltage at the output circuit of this network or on the potential of the output circuit 116 of the cathode follower 113. The time constant of the circuit to the cathode follower 115 is, however, low, so that the positive pulse will actually appear at the output circuit 117. Nevertheless the potential of the control circuit 123 will not become higher than the unchanged potential of the conductor 116 because the diode 120 will remain conductive and constitute a direct connection between the control circuit 123 and the conductor 116, so that the diode 121 is blocked and the conductor 117 with its increased potential is isolated from the circuit 123. The direction of the diode 119 is opposite to that of the diode 121, so that a positive pulse will cause the diode 119 to be conductive, thus maintaining the electrical contact between the conductor 117 and the control circuit 124, so that the potential of this control circuit is increased and the diode 118 is blocked in order to isolate the control circuit from the conductor 116, which has a lower potential. The increased potential of the control circuit 124 causes the trigger circuit 127 to change its state. This trigger circuit supplies at its output circuit 128 a voltage which depends on its state. This voltage reproduces the recordings on the drum. A positive pulse, received through the control circuit 124, urges the trigger circuit into a state in which it supplies, by way of its output circuit 128, a potential which corresponds to the bit of the type the recording of which is situated after the change of the magnetization of the recording surface scanned by the magnetic head when supplying the pulse initiating this change of state.

A pulse applied to the input circuit of the amplifier such that a negative pulse is superposed on the quiescent potential of the output circuit 108 of the amplifier will also have no influence on the voltage at the output circuit 116; this pulse is transmitted to the output circuit 117 of the cathode follower 115 in a way similar to that of the positive pulse treated above. Nevertheless the potential of the conductor 124 will not become lower than that of the conductor 116 because the diode 118 remains conductive, while the diode 119 disconnects the control circuit 124 from the conductor 117 so that the decreased potential of this conductor does not influence the potential of the said control circuit. The negative pulse will, however, pass the diode 121, and consequently decrease the potential of the control circuit 123, causing the diode 120 to become blocked, so that the potential of the conductor 116 is unable to influence the potential of the control circuit 123. This negative pulse causes the trigger circuit to change its condition in the opposite sense, as a result of which it supplies a potential to its output circuit which corresponds to a bit of the other type.

As a rule a trigger circuit responds to pulses of the same sign by means of its two control circuits. The pulses supplied to the control circuits by the amplifier 107 are, however, of opposite sign, so that in most cases a phase inverter, such as shown as element 126, must be inserted in one of the two control circuits of the trigger circuit. Obviously the trigger circuit 127 responds to negative control pulses, since the phase inverter is in the control circuit 124, to which positive pulses are applied.

Figure 2:
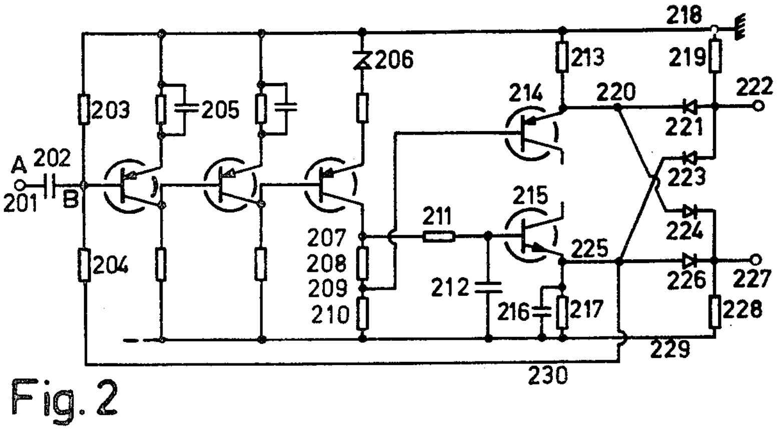
FIGURES 2 and 3 show embodiments of systems according to the invention in which transistor amplifiers are used.

FIGURE 2 shows a circuit of a similar system operating with transistors. In this figure only that part of the system is shown which corresponds to the part of FIGURE 1 situated between the dotted lines. Terminal 201 is the output terminal of the electronic selector which establishes the connection between the amplifier and one of the magnetic heads. The pulses supplied by this magnetic head appear at this terminal. The separating collector 202 applies these voltage pulses to the input terminal B of the transistor amplifier with direct current coupling circuits which comprises three transistors in cascade. Apart from the direct current level the voltage at the terminal B completely corresponds to that at the terminal A. The transistor amplifier is of a construction well-known in the art, and will therefore not be explained. The emitter resistances of the first two stages are bridged by a small capacitor, such as 205, in order to reduce the undesirable effect of the transistors on the amplification of the higher frequencies. In addition, a Zener-diode 206 is inserted between ground and the emitter resistance of the last stage of the amplifier. This Zener-diode changes the supply voltage by a constant value, which is independent of current. This is desirable because, as a result of the direct current coupling circuits between the stages, the base potential of the transistor in a certain stage is a little lower than that of the transistor in the previous stage. Consequently the collector resistance of the last stage would have to be substantially smaller with respect to the emitter resistance than in the previous stages, so that the amplification of the last stage would become low. If, however, the supply voltage of the emitter circuit is reduced to a lower level by means of the Zener-diode 206, the emitter resistance may be smaller so that the amplification will remain higher. A similar effect would have been obtained by supplying the successive stages with different supply voltages, but this would require a complicated feeding system. The output voltage of the direct current transistor amplifier is supplied to an R-C network with a resistance 211 and a capacitor 212. The time constant of this network is large with respect to the duration of a bit applied to the amplifier. The voltage across the capacitor 212 of this network corresponds to the average value of the output voltage of the amplifier, and is supplied by way of a common collector amplifier 215 with an emitter resistance 217 to the output circuit 225. By means of the tap point 209 of a voltage divider with the resistances 208 and 210, a voltage derived from the output voltage of the amplifier is applied to a second common collector amplifier 214 in a circuit, the time constant of which is very low. Through its emitter resistance 213, this common collector amplifier supplies a voltage corresponding to the output voltage of the amplifier to the output circuit 220, the amplified pulses ıcluded. The output circuits 220 and 225 are conected to the control circuits of a trigger circuit (shown s 127 in FIG. 1) by way of "or" circuits responding to ulses of opposite sign. The diodes 221 and 223 of the pper "or" circuit are connected by way of a resistance 19 and a conductor 218 to ground, so that this upper or" circuit is supplied with a potential which is alays higher than the potentials of the output circuits 20 and 225. On the other hand the "or" circuit with e diodes 224 and 226 is connected by way of resistance 28 and the conductor 229 to the source of negative supply oltage of the complete transistor amplifier, so that a otential which is always lower than the potentials of e conductors 220 and 225 is applied to the lower "or" rcuit.

Assume that the transistor amplifier supplies a posive pulse. This pulse does not influence the potential f the conductor 225, but appears at the conductor 220, hich consequently is given a higher potential than the onductor 225. This high potential causes the diode 224 be conductive and increases the potential of the conol circuit 227 of the trigger circuit without the low otential of the conductor 225 being able to prevent this otential change, because the increased potential of the ontrol circuit 227 blocks the diode 226. On the other and the diode 223 will be conductive as a result of the wer potential of the conductor 225, so that the conol circuit 222 remains at the constant potential of the onductor 225, while the diode 221 is blocked with the sult that the positive pulse will be unable to influence e potential of the control circuit 222. If the amplifier oduces a negative pulse at its terminal 207, then this ılse causes the potential of the conductor 220 to beome lower than the potential of the conductor 225. his causes the diode 224 to be blocked, so that the otential of the control circuit 227 is not affected. The ode 221, on the other hand, will be conductive, so at the potential of the control circuit 222 is decreased d a pulse is transmitted to this control circuit, causing e diode 223 to be blocked in order to prevent the higher otential of the conductor 225 from disturbing this eration.

The control by means of a common collector amplifier 5 requires a certain base current, which flows by way resistance 211. This causes the potential across the pacitor 212 to differ slightly from the average potential the terminal 207. The common collector amplifier 214 uses a similar change of potential. If the common coltor amplifier 214 and the network with a large time connt are fed from the same terminal, e.g. from the terminl 207, the level on which the pulses transmitted by the mmon collector amplifier 214 are superposed will differ om the potential applied by the common collector amfier 215 to the conductor 225. This difference is small d need not disturb the correct operation of the system, cause the diodes require a certain voltage in order to come conductive or blocked; nevertheless the asymetry resulting therefrom is undesirable. These objecns can be met in various ways, one of which is applied the circuit shown in the figure. The common collector plifier 215 comprises a transistor of a type different om that of the transistors in the direct voltage amplifier d in the common collector amplifier 214, the transistor 5 being an NPN transistor instead of the PNP trantors used elsewhere in the system. Consequently base current flows from the terminal 207 by way of istance 211 to the transistor 215 causing the potential of upper terminal of the condenser 212 to be a little wer than the average potential of the terminal 207, ich is the output terminal of the amplifier. The potial of the conductor 225 will under these circumnces also be a littlle lower than the potential of the conctor 220. In order to prevent the voltage drop in the istance 211 from disturbing the correct operation in the cuit shown, the base of the common collector amplifier 214 and the network with a large time constant are connected to different taps of a voltage divider in the output circuit of the amplifier. The network with a large time constant is connected to a tapping point, the potential of which is so much higher than that of the tapping connected to the said base that in the quiescent condition the potentials of the conductors 220 and 225 are equal, or at any rate differ substantially less. When adjusting the tapping point 209 the voltage-drops in the transistors of the two common collector amplifiers must as a rule also be taken into account. In the circuits according to FIGURE 2 these voltage-drops have opposite sign and such a direction that without compensation by a suitable selection of the position of the said tapping point the difference between the quiescent potentials of the conductors 220 and 225 would be increased. In order to obtain the highest possible efficiency of the system the network with a large time constant is connected to the full output voltage of the amplifier, while the base of the common collector amplifier 214 is connected to a tapping point 209 of the voltage divider 208, 210 in the output circuit of the amplifier.

The method shown in FIGURE 2 for compensating for the voltage-drop caused by the transistor base current in the resistance of the network with a large time constant, is not the only possible one. In all alternatives, however, the quiescent potentials of the two input circuits of the "or" circuits are made equal or at any rate substantially equal by means of one or more voltage dividers. Assume, for example, that in the circuit according to FIGURE 2 the transistor 214 is replaced by an NPN transistor, the emitter resistance of which must be connected to the negative terminal of a supply voltage source, and that, furthermore, the base of this transistor is connected to the same point of the output circuit of the preceding amplifier as the network with a large time constant. In the quiescent state of the circuit the potential of the emitter of the said transistor will then be higher than the emitter-potential of the common base amplifier mounted after the network with a large time constant. In this circuit the voltage-drop in the resistance of the network with a large time constant can be compensated for by connecting the conductor, which corresponds to the conductor 220 in FIGURE 2, to a tapping point of a voltage divider connecting the emitter of the common base amplifier replacing the transistor 214 with the negative terminal of the supply voltage source and acting as emitter resistance instead of with the said emitter of the NPN transistor itself.

Figures 3, 4:
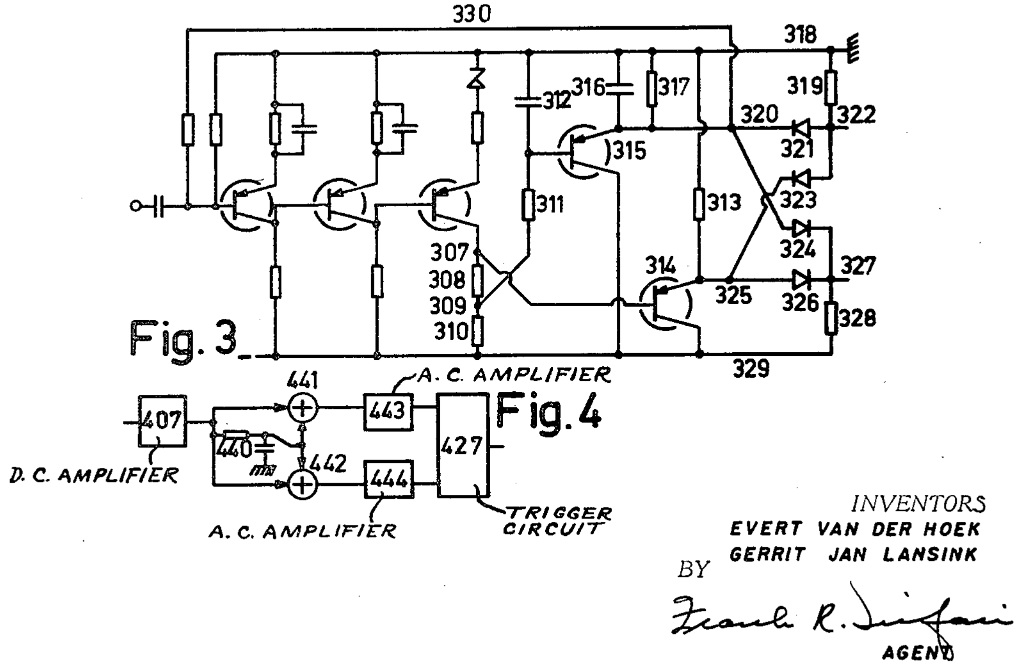
FIGURE 4 shows a block diagram of a system according to the invention in which a part of the required amplification is effected by alternating current amplifiers.

FIGURE 3 shows another circuit in which the same type of transistor is used in both common collector amplifiers; by way of example, PNP transistors are shown. In order to facilitate the reading of the diagram the last two figures of the reference numbers in FIGURE 2 and FIGURE 3, relating to corresponding parts, are the same. The control circuit 322, by means of which negative pulses are passed to the trigger circuit, is the output circuit of an "or" circuit 319, 321, 323. One output circuit of this "or" circuit is connected to the emitter of the common collector amplifier 315, the base of which is connected by way of a circuit comprising a network with a high time constant to the output terminal of the amplifier. This output circuit consequently carries a potential which corresponds to, but, as will be shown, is not completely equal to, the average potential of the said output terminal of the amplifier. The second input circuit of the "or" circuit is connected to the emitter of the common collector amplifier 314, the base of which is directly connected to the output terminal of the amplifier and consequently passes the amplified pulses. The base current of the common collector amplifier 315 flows by way of resistance 311 to the output terminal of the amplifier, so that the base potential of the common collector amplifier 315 will be higher than the average potential of the said amplifier output terminal. The base potential of the common collector amplifier 314 is not subjected to a similar change.

Nevertheless it is desirable for the quiescent output potentials of the common collector amplifiers 314 and 315 to be substantially equal. For this purpose the base of the common collector amplifier 314 and the network with a large time constant are connected to different tapping points of a voltage divider 308, 310 in the output circuit of the amplifier. In order to make the most of the amplification of the amplifier, the base of transistor 314 is directly connected to the output terminal 307 of the amplifier, which terminal is itself connected to the collector of the last transistor in the preceding amplifier, while the resistance 311 of the network with a large time constant is connected to the tapping point 309 of the voltage divider 308, 310 in the output circuit of the said amplifier. It would, however also be feasible to connect the base of the transistor 314 as well as the input terminal of the network with a large time constant 311, 312 to the same point in the output circuit of the preceding amplifier, provided, however, that the conductor 325 is not directly connected to the emitter of the transistor 314, but to a suitable tapping point of the resistance 313.

Although in the system described above the drift of the direct current amplifier does not prevent the separation of the pulses to be applied to the trigger circuit, it is nevertheless undesirable for the drift to be too great, since this would cause the amplifier to leave its most suitable operating range. In order to reduce the drift to such an extent that the amplifier will continue to operate in its most suitable range, the network with a large time constant already present in the system is used as part of a negative feed back circuit with a large time constant. In the embodiments shown in the figure, for this purpose, the voltage present at the emitter of the common collector amplifier connected to the network with a large time constant is applied to a voltage divider, a tapping point of which is connected to the base of the first transistor in the amplifier. The conductor by means of which this negative feed back is established is the conductor 230 in FIGURE 2 and the conductor 330 in FIGURE 3. The negative feed back circuit established in this way is too slow to influence the amplification of the pulses but it substantially reduces the change of the level on which these pulses are superposed.

As a result of the measures according to the invention a direct current amplifier is shown to be feasible for amplifying positive and negative pulses to such an amplitude that these pulses can be separated by means of devices which respond to voltage polarity. This amplitude is smaller than the amplitude required for triggering trigger circuits. It would be possible for the direct current amplifier to have such an amplification that the trigger circuits would be able to respond directly to the separated pulses. In view of the known disadvantages of direct current amplifiers this would not be recommendable even in a circuit according to the invention. Preferably a direct current amplifier amplifies the pulses only to such an extent as is required for an effective separation of pulses of opposite sign, the two control circuits of the trigger circuits each comprising a separate alternating current amplifier which amplifies the separated pulses to the amplitude required for triggering the trigger circuit. After the separation has been effected, the amplification of the pulses by means of alternating current amplifiers is possible since the trigger circuit, as a rule, responds only to pulses of a certain sign, and should the trigger circuit respond to pulses of both signs it would be easy, by means of diodes or similar means, to suppress the pulses of the wrong sign resulting from differentiation in the alternating current amplifier. The pulses resulting from differentiation in the alternating current amplifiers in the control circuits of the trigger circuit will, therefore, not influence this trigger circuit.

FIGURE 4 shows a system in which alternating current amplifiers are inserted in the control circuits of the trigger circuit. Element 407 is the direct current amplifier. The output voltage of this amplifier is applied to a network with a large time constant 440 and to two "or" circuits 441 and 442 which compare the output voltage of the amplifier with the output voltage of the circuit with a large time constant. One of these "or" circuits passes a pulse to the trigger circuit when the output voltage of the amplifier is increased, while the other passes such a pulse when the output voltage of the amplifier is decreased. The output circuits of the two "or" circuits are connected to the control circuits of the trigger circuit 427, which restores the original bits. Each of these two control circuits comprises an alternating current amplifier 443, 444. One of these amplifiers causes a phase reversal of the amplified pulses whilst the other amplifier does not cause a reversal. Which of the two amplifiers must effect such a phase reversal is determined by the polarity of the pulses to which the trigger circuit responds.

It is obvious that various alternatives of a system according to the invention may be built. It is not necessary for the amplifier to be a transistor amplifier. Moreover, the circuits which respond to the direction of the pulses need not be "or" circuits. Other circuits responding to the direction of a voltage can also be used, including circuits operating with grid controlled electron tubes and transistors.

If in the above specification a voltage or potential is denoted as "a voltage derived therefrom" or "a potential derived therefrom," it is to be understood that this expresses that the said voltage or potential is derived from another voltage or potential by means of a cathode follower, a common collector amplifier or a voltage divider, or by a combination of these means. For example, in FIG. 2 e.g. the voltage at the point 220 is derived from the output voltage of the direct current amplifier by means of the voltage divider 208, 210 and the common collector amplifier 214. In a similar way the voltage applied to the network with a large time constant in the circuit according to FIGURE 3 is derived from the output voltage of the direct current amplifier by means of the voltage divider 208, 310, while the voltage applied to conductor 320 is derived from the output voltage of the said network with a large time constant by means of the common collector amplifier 315. Similarly in the embodiments described in the specification but not shown in the drawing, voltages are in some cases derived from other voltages by means of a common collector amplifier and a voltage divider in the emitter circuit of this amplifier.

While the invention has been described with respect to various embodiments, it is to be understood that various modifications and changes thereof will readily occur to those skilled in the art without departing from the inventive concept, the scope of which is set forth in the appended claims.

What we claim is:

1. Apparatus for reading binary magnetic recordings on a moving magnetic surface, comprising: at least one magnetic head adapted to co-act with said magnetic recordings and having a sensing winding coupled thereto, a direct current amplifier having an input circuit and an output circuit, circuit means for coupling the pulse voltages induced in the sensing winding of a magnetic head to said input circuit, a delay network having an input circuit and an output circuit and a time constant which is large with respect to the duration of the pulses generated in said sensing winding, the output circuit of the direct current amplifier being coupled to the input circuit of the delay network, a bi-stable trigger circuit having two control circuits, said trigger circuit being in the first of its two stable states in response to a pulse received through the first one of said two control circuits and being in the second stable state in response to a pulse received through the second one of said two control circuits, two threshold devices, each having an output circuit and two input circuits, each of the control circuits of the trigger circuit being coupled to the ouput circuit of a particular one of said threshold devices, the output circuit of the delay network being coupled to the first one of the input circuits of both threshold devices, the output circuit of the direct current amplifier being coupled to the second one of the input circuits of both threshold devices, one of the threshold devices having a threshold potential such that the voltage applied to its second input circuit appears at its ouput circuit when this voltage is greater by a predetermined amount than that of the voltage at its first input circuit, the other threshold device having a threshold potential such that the voltage applied to its second input circuit appears at its output circuit when this voltage is less by a predetermined amount than that of the voltage at its first input circuit.

2. Apparatus according to claim 1, wherein each control circuit of the trigger circuit is coupled to the output circuit of a threshold device by means of an alternating current amplifier.

3. Apparatus according to claim 1, including a negative feedback circuit for the direct current amplifier, the output voltage of the delay network being fed back to the input of the direct current amplifier through said negative feedback circuit.

4. Apparatus according to claim 1, wherein the output circuit of the first threshold device is coupled to a point of constant potential lower than the potential supplied to its input circuits, a diode being located in each input circuit of said first threshold device, each diode of the first threshold devices being poled such that at least one of these diodes is always conductive, the output circuit of the second threshold device being coupled to a point of constant potential higher than the potential applied to its input circuits, and a diode being located in each input circuit of said second threshold device, each diode of the second threshold devices being poled such that at least one of these diodes is always conductive.

5. Apparatus according to claim 4, wherein the output circuits of said first and second threshold devices are coupled to said points of constant potential through resistors, the diodes of the first threshold device being poled in the same direction with respect to said first threshold device, and the diodes of the second threshold device being poled in the same direction with respect to said second threshold device.

6. Apparatus for reading binary magnetic recordings on a moving magnetic surface, comprising: at least one magnetic head adapted to co-act with said magnetic recordings and having a sensing winding coupled thereto, a direct current amplifier having an input circuit and an output circuit, circuit means for coupling the pulse voltages induced in the sensing winding of a magnetic head to said input circuit, a delay network having an input circuit and an output circuit and a time constant which is large with respect to the duration of the pulses generated in said sensing winding, the output circuit of the direct current amplifier being connected to one end of a first voltage divider which has a tap point connected to the intput circuit of the delay network, a bi-stable trigger circuit having two control circuits, said trigger circuit being in the first of its two stable states in response to a pulse received through the first one of said two control circuits and being in the second stable state in response to a pulse received through the second one of said two control circuits, two threshold devices, each having an output circuit and two input circuits, each of the control circuits of the trigger circuit being coupled to the output circuit of a particular one of said threshold devices, the output circuit of the delay network being coupled to the first one of the input circuits of both threshold devices through a first common collector amplifier with the output circuit of the delay network connected to the base and the input circuits of the threshold devices connected to the emitter, the output circuit of the direct current amplifier being connected to one end of a second voltage divider, a second common collecter amplifier, the tap of the second voltage divider being connected to the base of the second common collector amplifier, the emitter of the second common collector amplifier being connected to the second one of the input circuits of both threshold devices, one of the threshold devices having a threshold potential such that the voltage applied to its second input circuit appears at its output circuit when this voltage is greater by a predetermined amount than that of the voltage at its first input circuit, the other threshold device having a threshold potential such that the voltage applied to its second input circuit appears at its output circuit when this voltage is less by a predetermined amount than that of the voltage at its first input circuit.

7. Apparatus according to claim 6, wherein said first and second voltage dividers are constituted by a single voltage divider.

8. Apparatus for reading binary magnetic recordings on a moving magnetic surface comprising: at least one magnetic head adapted to co-act with said magnetic recordings and having a sensing winding coupled thereto, a direct current amplifier having an input circuit and an output circuit, circuit means for coupling the pulse voltages induced in the sensing winding of a magnetic head to said input circuit, a delay network having an input circuit and an output circuit and a time constant which is large with respect to the duration of the pulses generated in said sensing winding, means for coupling the output circuit of the direct current amplifier to the input circuit of the delay network, first and second common collector amplifiers, the output circuit of the direct current amplifier being coupled to the base of the said second common collector amplifier, a bi-stable trigger circuit having two control circuits, said trigger circuit being in the first of its two stable states in response to a pulse received through the first one of said two control circuits and being in the second stable state in response to a pulse received through the second one of said two control circuits, two threshold devices, each having an output circuit and two input circuits, each of the control circuits of the trigger circuit being coupled to the output circuit of a particular one of said threshold devices, the output circuit of the delay network being connected to the base of the first common collector amplifier, the emitter of the first common collector amplifier being coupled to the first one of the input circuits of both threshold devices, the emitter of the second common collector amplifier being coupled to the second ones of the input circuits of both threshold devices, one of the threshold devices having a threshold potential such that the voltage applied to its second input circuit appears at its output circuit when this voltage is greater by a predetermined amount than that of the voltage at its first input circuit, the other threshold device having a threshold potential such that the voltage applied to its second input circuit appears at its output circuit when this voltage is less by a predetermined amount than that of the voltage at its first input circuit.

9. Apparatus as claimed in claim 8, further including a voltage divider inserted in at least one of the two couplings between the input circuits of the threshold devices and the emitters of the associated common collector amplifiers, the tap of a voltage divider being coupled to the corresponding input circuits and one end of the voltage divider being connected to the associated emitter.

No references cited.

IRVING L. SRAGOW, *Primary Examiner.*